United States Patent

[11] 3,581,170

| [72] | Inventor | Donald E. Barber |
| | | Oak Creek, Wis. |
| [21] | Appl. No. | 878,032 |
| [22] | Filed | Nov. 19, 1969 |
| [45] | Patented | May 25, 1971 |
| [73] | Assignee | Bucyrus-Erie Company |
| | | South Milwaukee, Wis. |

[54] AUTOMATIC TORQUE CONTROL FOR A DUAL STATOR MOTOR
5 Claims, 3 Drawing Figs.

[52] U.S. Cl. .................................................. 318/214, 318/243
[51] Int. Cl. ................................................... H02p 7/36
[50] Field of Search .......................................... 318/214, 243

[56] References Cited
UNITED STATES PATENTS

| 3,280,400 | 10/1966 | Roe ........................... | 318/243 |
| 3,290,574 | 12/1966 | Roe ........................... | 318/214 |
| 3,376,483 | 4/1968 | Stilley et al. .................. | 318/214 |

Primary Examiner—Oris L. Rader
Assistant Examiner—Gene Z. Rubinson
Attorneys—Thomas O. Kloehn and Arthur H. Seidel ABSTRACT: A control system for a dual stator induction motor has a rotary actuator which rotates one stator to thereby control the torque produced by the motor. This torque is sensed by a watts transducer connected to measure the electrical power supplied to the motor and which generates a torque feedback signal that is linearly related to the electrical power being supplied. This feedback signal is summed with a manually adjustable reference signal which summed signal is amplified to produce a torque control signal that drives the rotary actuator. The reference signal is set by the operator for the desired torque and the rotary actuator continuously positions the stator in response to the resulting torque control signal to maintain a relatively constant torque as the motor speed varies.

INVENTOR
DONALD E. BARBER

AUTOMATIC TORQUE CONTROL FOR A DUAL STATOR MOTOR

BACKGROUND OF THE INVENTION

There are numerous cases where it is desirable to use an electric motor which will produce a constant torque within its operating speed range. For example, such a motor is used in the swing drive of large electric machines such as shovels, cranes and draglines. To produce a rapid and smooth swinging motion in these machines it is desirable to apply a relatively constant accelerating torque. A DC Ward Leonard control system exhibits this characteristic and is quite commonly used for swing drives. The cost of these systems, however, is great and contributes substantially to the overall cost of the machines.

AC motors are undesirable for use as swing drives. Due to their high locked rotor current, squirrel cage motors tend to overheat when used as swing drives. Wound rotor motors display a "drooping" torque-speed curve characterized by a continuously decreasing torque with increasing motor speed. AC motor systems are available which produce flat torque-speed characteristics like that of the DC Ward Leonard system, but these systems necessitate the use of costly high-powered control devices connected in the input to the motor. Such control is both costly and complex as well as being disproportionally large in physical size when compared to the motor. These factors have made the commercial use of AC motors as swing drives on large machines impractical.

The present invention makes use of a dual stator drive induction motor to produce a drive system with a relatively flat torque-speed output characteristic. The dual stator drive motor is basically an AC induction motor with its stator divided into two segments, either one or both of which may be rotatably adjusted relative to one another. This feature allows the phase relationship of the currents in the two stator segments, and consequently the current which they induce in the rotor, to be adjusted with respect to one another for a continuous precise control of the torque of the motor. Dual stator drive motors, generally are well known to the art as evidenced by recent U.S. Pats. issued to Roe, Nos. 3,280,400; 3,280,928; and 3,290,574, as well as older U.S. Pats. to Gorges, No. 547,069 and to Meuschel, No. 727,662.

Although the dual stator arrangement provides an inexpensive and uncomplicated means for altering the torque-speed characteristics of an AC motor, there has been very limited use made of this feature. One of the principal causes for this lack of interest in using the motor has been eliminated by the recent discovery of Romeo T. Calud and disclosed in his copending application, Ser. No. 878,860 filed Nov. 21, 1969 entitled "Dual Stator Induction Motor Torque Sensor," Which shows an inexpensive and practical means of measuring the torque of a dual stator induction motor. A control system making the dual stator induction motor useful as a drive motor which can replace DC drive motor systems, is a further advance in the art which has not heretofore been made.

SUMMARY OF THE INVENTION

The invention resides in a control system for use with a dual stator induction motor which will produce an electric motor drive with a relatively flat and adjustable torque-speed characteristic similar to that of the DC Ward Leonard system. This control system includes a dual stator induction motor and a suitable stator positioning device or rotary actuator. The rotary actuator is operated by a torque control signal produced by summing two input signals. These input signals consist of a reference signal which can be introduced by the operator through his control switch. Electrically opposing this reference signal is a torque feedback signal which is a signal proportional to the electrical power supplied to the motor as measured by a watts transducer. These two signals interact to control the dual stator induction motor and give it torque-speed characteristics similar to that of a DC Ward Leonard system.

It is a general objective of this invention to provide an inexpensive, compact and reliable system for controlling the torque of a dual stator induction motor. More specifically, it is an objective of this invention to provide a control system for a dual stator induction motor which gives it a relatively flat torque-speed characteristic.

Other objects and advantages will appear from the description to follow. In the description, reference is made to the accompanying drawings, forming a part hereof, in which there is shown, by way of illustration and not of limitation, a preferred embodiment of the invention.

DESCRIPTION OF THE PREFERRED EMBODIMENT

Figure 1:
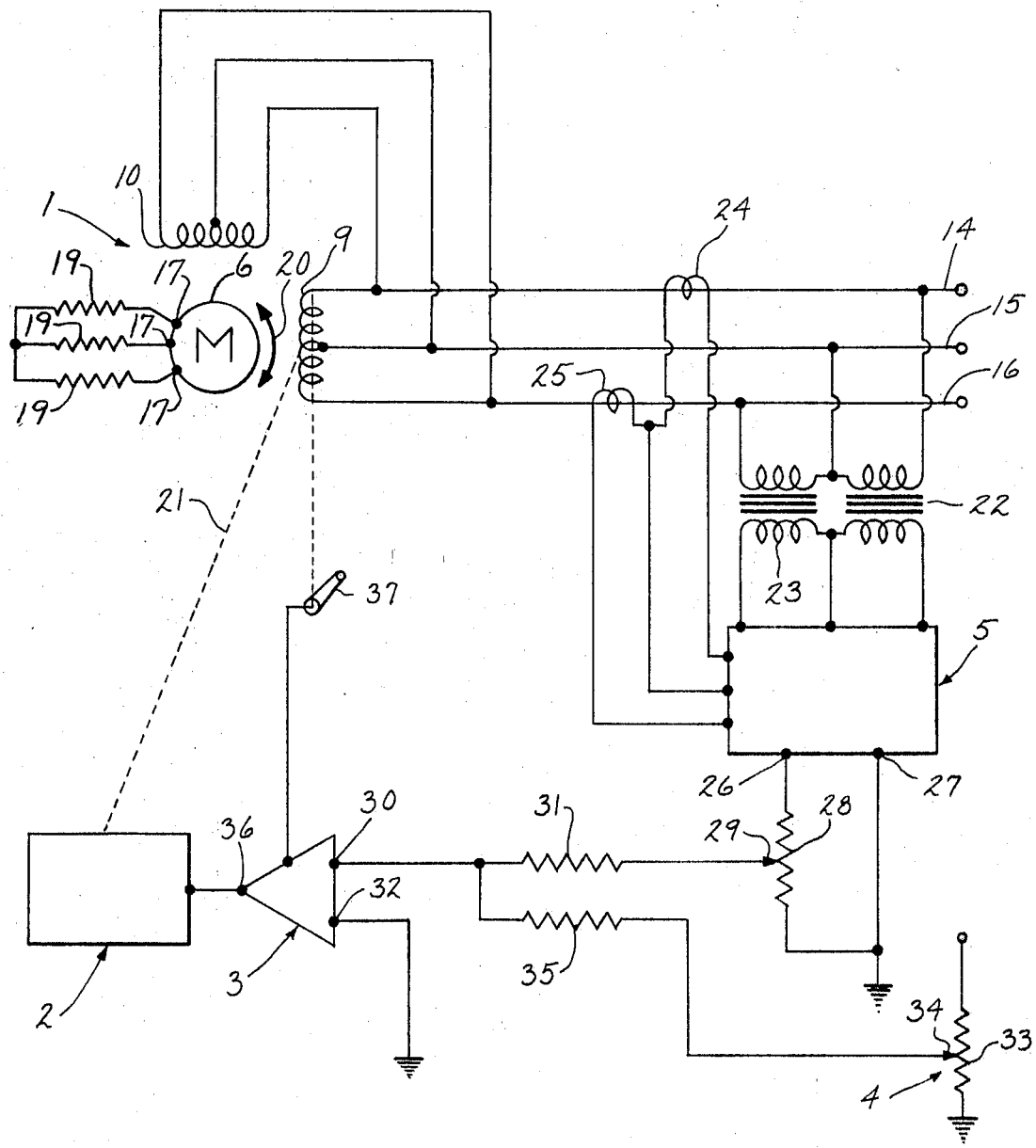
FIG. 1 is a schematic diagram of the preferred embodiment of the control system.

The automatic torque control system shown in FIG 1 consists of five basic components; a dual stator induction motor 1, a rotary actuator 2, a summing amplifier 3, a reference signal source 4, and a watts transducer 5.

Figure 2:
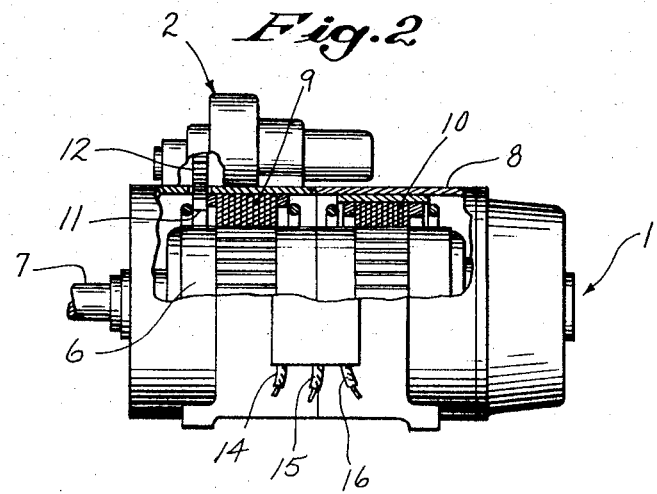
FIG. 2 is a partial cutaway side view of the dual stator induction motor used in the preferred embodiment of the invention.

The dual stator motor shown schematically in FIG. 1 is shown pictorially in FIG. 2. It shows a rotor 6 and its shaft 7 supported by a motor frame 8. The motor 1 has a stator in the form of two, separate, stator segments 9 and 10, which are relatively rotatably adjustable with respect to one another. The adjustment of the stator segments 9 and 10 is achieved by mounting one of the stator segments 10 in fixed relationship to the motor frame 8, and by mounting the other stator segment 9 for limited rotary movement in the motor frame 8. The adjustable or movable stator segment 9 has an arcuate gear segment 11 mounted on it that is engaged by a pinion 12 mounted on a drive shaft of a rotary actuator 2. The rotary actuator 2 may be an electric motor as in the preferred embodiment, a hydraulic motor, a pneumatic motor, or any other equivalent device which will rotate the pinion 12 in response to a torque control signal.

Referring back to FIG. 1, the two stator segments 9 and 10 are shown connected to a three-phase AC power source through lines 14, 15 and 16. The terminals 17 on the rotor 6 connect to rotor resistors 19.

The stator segment 9 rotates in the directions indicated by the schematic vector 20. This is caused by the rotary actuator 2 acting through a mechanical linkage represented schematically by the dashed line 21. As shown in FIG. 2, this mechanical linkage consists of a pinion 12 and an arcuate gear segment 11 in the preferred embodiment of the invention.

The watts transducer 5 shown in FIG. 1 is a two-element polyphase watts transducer. Because of the high current and voltage in the power lines 14, 15 and 16, the watts transducer 5 is connected through appropriate current and voltage transformers in order to protect the delicate coils. Voltage transformer 22 has its primary connected across the power lines 14 and 15 and its secondary connected to the appropriate potential terminals on the watts transducer 5. A second voltage transformer 23 has its primary connected across power lines 15 and 16 and its secondary connected to the appropriate potential terminals on the watts transducer 5. Current transformer 24 is connected to the appropriate current terminals on the watts transducer 5 and indicates the current flowing in power line 14. Current transformer 25 is also connected to the appropriate current terminals on the watts transducer 5 and measures the current flow in power line 16. With this arrangement, the watts transducer 5 will produce a DC voltage at the output terminals 26 and 27 directly proportional to the three-phase AC power being supplied to the motor 1 through lines 14, 15 and 16. As disclosed in the Calud patent application cited above, this DC voltage is also linearly related to the torque of the motor 1 and this arrangement provides an inexpensive and accurate means for obtaining a torque feedback signal. Different watts transducers and connecting means can be used to obtain the same result.

To adjust the strength of this torque feedback signal one output terminal 27 of the watts transducer 5 is connected to ground while the other output terminal 26 is connected to ground through potentiometer 28. The slider 29 on the potentiometer 28 is connected to the input terminal 30 on the summing amplifier 3 through a coupling resistor 31. A second input terminal 32 on the amplifier 3 is connected to ground.

A reference signal is supplied by a reference signal source 4 comprised of a DC reference voltage applied across a reference potentiometer 33 one end of which is connected to ground. The slider 34 on the reference potentiometer 33 is connected to the input terminal 30 through a coupling resistor 35. In this fashion the torque feedback and reference signals converge at a summing point, the input 30 of the summing amplifier 3.

The output terminal 36 of the summing amplifier 3 is connected to convey a torque control signal to the rotary actuator 2. This torque control signal produced by the summing amplifier 3 can swing both positive and negative, both the polarity and amplitude of the swing being determined by the summed signals applied to the input terminal 30. In the preferred embodiment of the invention a positive torque control signal will cause the rotary actuator 2 to rotate the stator segment 9 in a direction which will increase the torque of the motor 1. A negative torque control signal at the output terminal 36 will cause a rotation in the stator segment 9 which reduces the torque of the motor 1. The summing amplifier 3 is chosen such that it has sufficient power output to drive the rotary actuator 2 in either direction.

Action of the control system during motor acceleration will be such that when the operator sets the slider 34 to produce a control reference signal, it activates the summing amplifier 3 to produce a positive torque control signal at the output terminal 36. This positive torque control signal energizes the rotary actuator 2 to rotate the stator segment 9 from a zero torque position at the instant of starting, to a stator position such that the torque feedback signal generated by the watts transducer 5 will be of sufficient magnitude at the input terminal 30 of the summing amplifier 3 to return the amplifier output to zero. As acceleration begins and motor speed is developed, the inherent characteristic of the induction motor results in a loss of accelerating torque. Such a reduction causes a corresponding reduction in the torque feedback signal applied to terminal 30 of the summing amplifier 3, which will in turn allow the output of the summing amplifier 3 to go positive again and reposition the stator for increased torque. This repositioning continues until the torque feedback signal again is of such a magnitude that its summation at the input terminal 30 with the reference signal will produce no torque control signal at the output terminal 36 of the summing amplifier 3.

Repositioning action continues until the stator has reached maximum travel. At this point a maximum travel limit switch 37 is mechanically actuated. Actuation of this limit switch 37 prevents the summing amplifier from swinging positive as long as the stator segment 9 is in the maximum travel position. This prevents possible damage to the rotary actuator 2 after control of the motor torque is no longer possible through movement of the stator segment 9.

Deceleration is initiated when the operator moves the slider 34 on the reference potentiometer 33 to reduce the reference signal. As a result, the torque control signal appearing at the output terminal 36 of the summing amplifier 3 swings negative. This drives the stator segment 9 towards its zero torque position. When this position is reached the limit switch 37 is again actuated; this time, however, it prevents the summing amplifier output from swinging negative.

Figure 3:
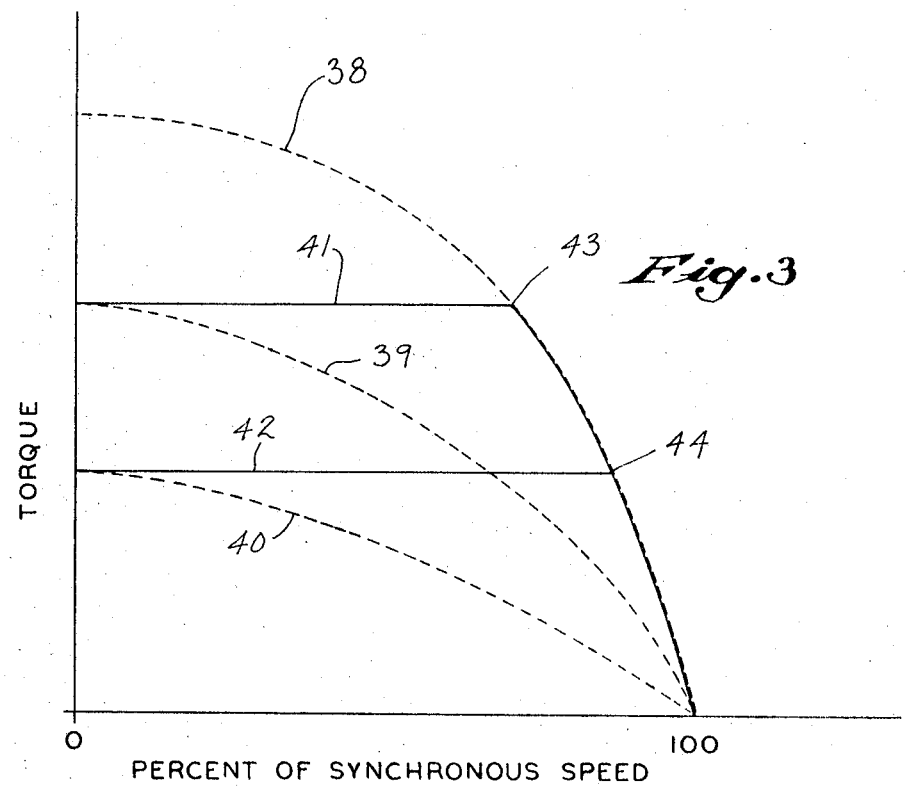
FIG. 3 is a graphic representation of various motor characteristics.

The results obtained from using this torque control system are shown by the torque-speed curves in FIG. 3. The dashed curves 38, 39 and 40 represent the torque-speed characteristics of a dual stator induction motor without the torque control system. Dashed curve 38 represents the inherent motor characteristic for a given values of rotor resistors 19 when the stator segment is positioned and fixed for maximum torque output. This "drooping" torque-speed characteristic is similar to that produced by a single stator wound rotor induction motor and is precisely the feature which prevents the use of AC motors as swing drives. Dashed curves 39 and 40 represent the motor characteristics when the stator segment 9 is fixed in alternative positions that produce less torque.

The solid curves 41 and 42 represent the torque-speed characteristics of a dual stator motor incorporating the torque control system shown in FIG. 1. These curves show a relatively constant torque output until they intersect the dashed curve 38 at points 43 and 44. The points 43 and 44 represent the points at which torque control is lost because the stator segment 9 has reached maximum travel. By positioning the slider 34 on the reference potentiometer 33 the operator can choose any torque he deems necessary. The solid curves 41 and 42 represent two such selections. The torque will not "droop" but will stay relatively constant at the value selected by the operator until it intersects the maximum inherent torque-speed characteristic of the motor represented in FIG. 3 by dashed curve 38. At this motor speed the torque will start to drop off. As indicated by the curves in FIG. 3, however, there is a substantial speed range in which the control system alters the characteristics of the induction motor to produce a flat torque-speed output. This alteration is performed by a unique use of inexpensive and reliable components which make the resulting system particularly desirable for use as the swing drive on electric machines. The system has application where a relatively constant accelerating torque is desirable or where it is desirable to maintain control of the torque at various rotary speeds. Its application is by no means limited to use as a swing drive. The aforesaid description of the invention and the manner of making and using it, is in such full, clear, concise and exact terms as to enable any person skilled in the art to which it pertains, or with which it is most nearly connected, to make and use the same, and sets forth the best mode contemplated by the inventor of carrying out his invention.

In contrast to the foregoing description, the following claims particularly point out and distinctly claim the subject matter which the applicant regards as his invention.

I claim:

1. In a torque control system for a dual stator induction motor having its stator divided into two segments, either one or both of which may be rotatably adjusted relative to one another to alter the torque of the motor, the combination of:
   a torque sensor connected to sense the torque produced by said motor and generate a torque feedback signal;
   a reference signal source;
   a summing point joining said torque feedback signal with said reference signal to produce a torque control signal; and
   a rotary actuator connected to rotate the stator segments relative to one another and in response to said torque control signal.

2. In a torque control system for a dual stator induction motor having its stator divided into two segments, either one or both of which may be rotatably adjusted relative to one another to alter the torque of the motor, the combination of:
   a watts transducer connected to sense the electrical power supplied to said motor and generate a torque feedback signal;
   a manually adjustable reference signal source;
   a summing amplifier connected to receive said torque feedback and reference signals and generate a torque control signal determined by the sum of said torque feedback and reference signals; and
   a rotary actuator connected to rotate the stator segments relative to one another and in response to said torque control signal.

3. The control system of claim 2 wherein: the torque feedback and reference signals are of opposite polarity and the summing amplifier output can swing both positive and negative.

4. The control system of claim 3 wherein: there is a limit switch which is actuated when the stator segments reach their zero torque and maximum travel orientations to inhibit further rotation of the rotary actuator beyond these orientations.

5. In a torque control system for a dual stator induction motor having its stator divided into two segments, one of which can be rotated to alter the torque of the motor, the combination of:

a watts transducer connected to sense the electrical power supplied to said stator segments and generate DC torque feedback signal;

a variable DC reference signal source;

a summing amplifier connected to receive said torque feedback and reference signals and generate a torque control signal of a polarity and amplitude determined by the sum of said torque feedback and reference signals; and a rotary actuator connected to rotate said rotatable stator segment in a direction and rate determined by said torque control signal.